(12) United States Patent
Yang (10) Patent No.: US 10,335,633 B2
(45) Date of Patent: Jul. 2, 2019

(54) DETACHABLE SPEED DETERMINING DEVICE CAPABLE OF COMPUTING ACCURATE SPEED INFORMATION OF A BICYCLE AND FIXING A BIKE COMPONENT OF THE BICYCLE

(71) Applicant: PixArt Imaging Inc., Hsin-Chu (TW)

(72) Inventor: Chung-Ting Yang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 15/627,463

(22) Filed: Jun. 20, 2017

(65) Prior Publication Data

US 2018/0361195 A1     Dec. 20, 2018

(51) Int. Cl.
| | |
|---|---|
| *A63B 22/06* | (2006.01) |
| *G01B 7/04* | (2006.01) |
| *G01B 7/14* | (2006.01) |
| *G01D 11/24* | (2006.01) |
| *G01D 5/12* | (2006.01) |
| *G01B 7/30* | (2006.01) |
| *G01P 3/38* | (2006.01) |

(52) U.S. Cl.
CPC ............ *A63B 22/0605* (2013.01); *G01B 7/04* (2013.01); *G01B 7/14* (2013.01); *G01B 7/30* (2013.01); *G01D 5/12* (2013.01); *G01D 11/245* (2013.01); *G01P 3/38* (2013.01); *A63B 2220/30* (2013.01); *A63B 2225/52* (2013.01)

(58) Field of Classification Search
None
See application file for complete search history.

(56) References Cited

U.S. PATENT DOCUMENTS

| | | | | |
|---|---|---|---|---|
| 4,555,656 A | * | 11/1985 | Ryan | H02J 7/1407 322/1 |
| 7,015,598 B2 | * | 3/2006 | Oohara | B62J 6/001 307/47 |
| 7,090,620 B1 | * | 8/2006 | Barlow | A63B 21/0053 482/2 |
| 9,027,691 B2 | * | 5/2015 | Ishida | B62M 6/50 180/206.3 |
| 2005/0029033 A1 | * | 2/2005 | Rip | B62H 5/20 180/220 |

(Continued)

*Primary Examiner* — Douglas X Rodriguez
(74) *Attorney, Agent, or Firm* — Winston Hsu (57) ABSTRACT

A detachable speed determining device includes an optical detecting module, an energy generating module and an energy storage module. The optical detecting module is adapted to determine axial rotational displacement of a bike component by detecting a movement of a pattern on the bike component. The energy generating module is adapted to generate energy. The energy storage module is sealed inside a housing of the detachable speed determining device in a water-resistance manner and electrically connected with the optical detecting module and the energy generating module. The optical detecting module is powered by the energy storage module, and the energy storage module is charged by the energy generating module. The detachable speed determining device further includes a bolted joint and a quick releasing handle, the bolted joint passes through an axle of the bike component, and the quick releasing handle is foldably disposed on the bolted joint.

15 Claims, 6 Drawing Sheets

(56) References Cited

U.S. PATENT DOCUMENTS

| | | | |
|---|---|---|---|
| 2008/0096725 A1* | 4/2008 | Keiser | A63B 21/0051 482/8 |
| 2012/0238406 A1* | 9/2012 | Beard | A63B 21/0053 482/2 |
| 2016/0016625 A1* | 1/2016 | Williams | B62M 6/55 280/287 |

* cited by examiner

DETACHABLE SPEED DETERMINING DEVICE CAPABLE OF COMPUTING ACCURATE SPEED INFORMATION OF A BICYCLE AND FIXING A BIKE COMPONENT OF THE BICYCLE

BACKGROUND OF THE INVENTION

1. Field of the Invention

The present invention relates to a detachable speed determining device, and more particularly, to a detachable speed determining device capable of fixing a bike component and computing accurate speed information of the bicycle.

2. Description of the Prior Art

With a tread of sport recreation, the bicycle is widespread applied for leisure time, a journey for pleasure, and a commute demand. The velocity meter is required while the user intends to realize a moving speed of the bicycle. The conventional velocity meter utilizes the global positioning system to detect the moving speed of the bicycle, detection accuracy of the conventional velocity meter is correct while the bicycle is located in a spacious region, and the detection accuracy is easily interfered and incorrect when the bicycle is ridden under the shelter, such as riding the bicycle in a tunnel or in a forest. Even though the bicycle is ridden in the spacious region, the detection accuracy may have slight error resulted by environmental factor; for example, the factor can be weather change or an amount of surrounding building. Therefore, design of a new-typed velocity meter is a popular issue for the bike industry.

SUMMARY OF THE INVENTION

The present invention provides a detachable speed determining device capable of fixing a bike component and computing accurate speed information of the bicycle for solving above drawbacks.

According to the claimed invention, a detachable speed determining device includes an optical detecting module, an energy generating module and an energy storage module. The optical detecting module is adapted to determine axial rotational displacement of a bike component by detecting a movement of a pattern on the bike component. The energy generating module is adapted to generate energy. The energy storage module is sealed inside a housing of the detachable speed determining device in a water-resistance manner and electrically connected with the optical detecting module and the energy generating module. The optical detecting module is powered by the energy storage module, and the energy storage module is charged by the energy generating module. The detachable speed determining device further includes a bolted joint and a quick releasing handle, the bolted joint passes through an axle of the bike component, and the quick releasing handle is foldably disposed on the bolted joint.

According to the claimed invention, the bike component is a wheel hub, the pattern is formed on an inner wall of a wheel hub axle, the optical detecting module is disposed on the bolted joint, and the bolted joint inserts into the wheel hub axle to detect the movement of the pattern by the optical detecting module. Further, the pattern may be formed on an outer surface of the wheel hub, the optical detecting module may be disposed on the quick releasing handle and face the outer surface to detect the movement of the pattern.

According to the claimed invention, the bike component is a chain wheel assembled with a pedal, the pattern is formed on an inner wall of a chain wheel axle, the optical detecting module is disposed on the bolted joint, and the bolted joint inserts into the chain wheel axle to detect the movement of the pattern by the optical detecting module. Further, the pattern may be formed on an outer surface of the chain wheel, and the optical detecting module may be disposed on the quick releasing handle and face the outer surface to detect the movement of the pattern.

According to the claimed invention, the energy generating module is a magnetic induction energy charging module having a permanent magnet and an induction coil, the permanent magnet is disposed on a rim of the bike component, the induction coil is spaced from the rim and located above a moving path of the permanent magnet while the bike component is rotated. The energy generating module is a solar-based energy charging module having at least one solar panel disposed on an outer surface of the housing.

According to the claimed invention, the detachable speed determining device further includes a wireless transmission module electrically connected with the optical detecting module and adapted to transmit the axial rotational displacement to an external electronic device, and further includes a charging socket electrically connected with the energy storage module and disposed on the housing and capable of being inserted by an external charging cable.

The number of turns of the wheel and the chain wheel are synchronized with the speed information of the bicycle, the axial rotational displacement of the bike component can be interpreted as the rotary turns of the wheel and the chain wheel, and the detachable speed determining device computes the velocity and acceleration via a detection result of the axial rotational displacement. Comparing to the prior art, the pattern and the optical detecting module can be set inside the axle or the outer surface of the bike component for easy assembly or preferred detection accuracy, the detachable speed determining device can acquire the accurate speed information even through the bicycle is in gear shifting, and manipulation of the detachable speed determining device is not affected by the weather factor and environmental interference.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
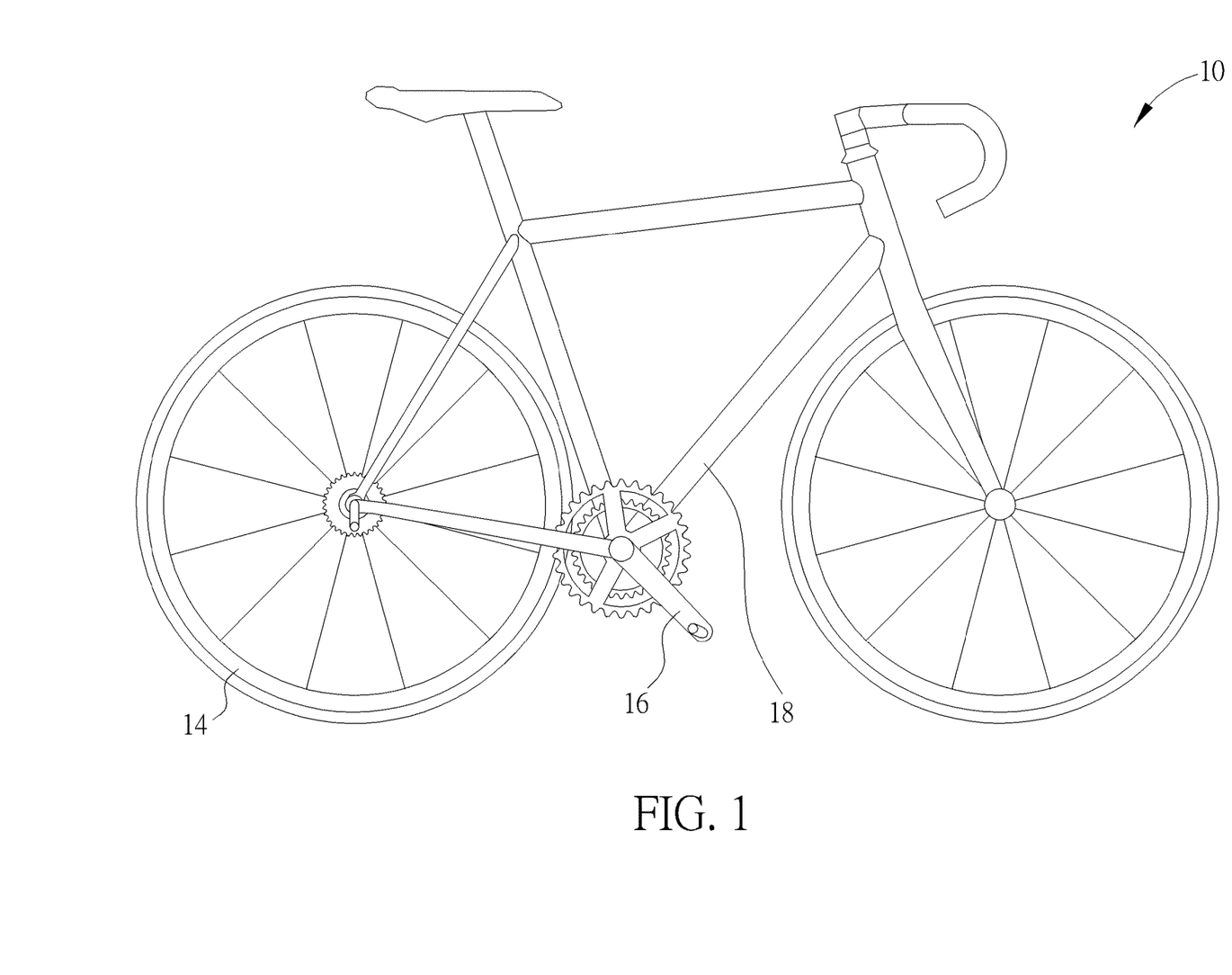
FIG. 1 is a diagram of a bicycle according to an embodiment of the present invention.
Figure 2:
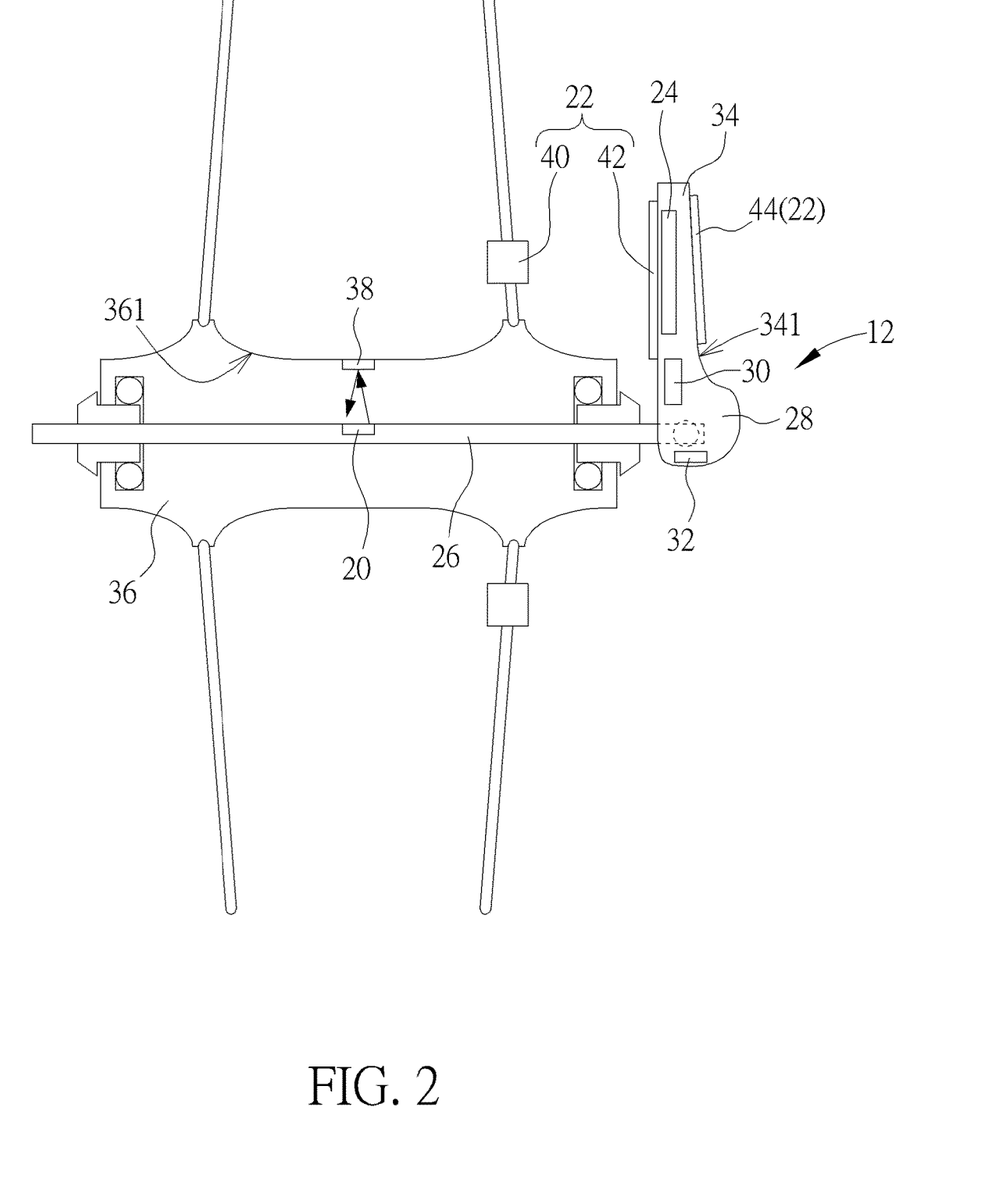
FIG. 2 is a partial diagram of the bicycle with a detachable speed determining device according to a first embodiment of the present invention.

Please refer to FIG. 1 and FIG. 2. FIG. 1 is a diagram of a bicycle 10 according to an embodiment of the present invention. FIG. 2 is a partial diagram of the bicycle 10 with a detachable speed determining device 12 according to a first embodiment of the present invention. A wheel 14 and a pedal 16 can be assembled with and disassembled from a frame 18 of the bicycle 10 via the detachable speed determining device 12, and the wheel 14 and the pedal 16 are represented as a generalized bike component of the bicycle 10. The detachable speed determining device 12 not only can be used in assembly/disassembly of the bike component and the frame 18, but also can detect axial rotational displacement of the bike component for computing a speed of the moving bicycle 10. The detachable speed determining device 12 can acquire an accurate detection result by utilizing the optical detecting technology to detect a pattern 38 on the bike component.

The detachable speed determining device 12 can include an optical detecting module 20, an energy generating module 22, an energy storage module 24, a bolted joint 26, a quick releasing handle 28, a wireless transmission module 30 and a charging socket 32. The optical detecting module 20 is utilized to determine the axial rotational displacement by detecting a movement of the pattern 38. The energy generating module 22 generates energy for self-support. The energy storage module 24 is sealed inside a housing 34 in a water-resistance manner, and electrically connected with the optical detecting module 20 and the energy generating module 22. The optical detecting module 20 is powered by the energy storage module 24, and the energy storage module 24 is charged by the energy generating module 22.

The bolted joint 26 passes through an axle of the bike component to connect the bike component and the frame 18. The quick releasing handle 28 is foldably disposed on the bolted joint 26 to lock the bike component with the frame 18. Further, the wireless transmission module 30 and the charging socket 32 can be optional units. The wireless transmission module 30 is electrically connected with the optical detecting module 20, and can be utilized to transmit the axial rotational displacement and speed information to an external electronic device, such like a smart phone installed on the frame 18. The charging socket 32 is electrically connected with the energy storage module 24 and disposed on the housing 34 of the detachable speed determining device 12, and can be inserted by an external charging cable for wire energy transmission.

As the embodiment shown in FIG. 2, the bike component is a wheel hub, the wheel hub is a part of the rim whereon a tire is disposed, and the pattern 38 is formed on an inner wall 361 of a wheel hub axle 36. The optical detecting module 20 is disposed on the bolted joint 26, the bolted joint 26 inserts into the wheel hub axle 36, and the optical detecting module 20 is located at position of the bolted joint 26 facing the pattern 38. While the wheel 14 is rotated, the optical detecting module 20 can detect the movement of the pattern 38, and compute the speed information of the bicycle 10 in accordance with occurrence frequency of the pattern 38 and dimensions of the wheel 14.

In the present invention, the energy generating module 22 can be a magnetic induction energy charging module which has a permanent magnet 40 and an induction coil 42. The permanent magnet 40 can be disposed on the rim of the bike component, and the induction coil 42 can be disposed on the quick releasing handle 28. The induction coil 42 is spaced from the rim and located above a moving path of the permanent magnet 40 while the bike component is rotated, and the induction coil 42 is able to generate the energy through rotation of the permanent magnet 40 and the related rim. In addition, the energy generating module 22 further can be a solar-based energy charging module having at least one solar panel 44 disposed on an outer surface 341 of the housing 34. The solar panel 44 can transform solar energy into electric energy and the electric energy is stored into the energy storage module 24.

The energy generating module 22 can be one of the magnetic induction energy charging module and the solar-based energy charging module, or can be a combination of the magnetic induction energy charging module and the solar-based energy charging module. The solar-based energy charging module is used to charge the energy storage module 24 while the bicycle 10 is idle or ridden under the sunny day, and the magnetic induction energy charging module is used to charge the energy storage module 24 while the bicycle 10 is in use. The energy storage module 24 is sealed inside the housing 34, so the energy storage module 24 is non-replaceable for preferred water resistance and service durability, and the detachable speed determining device 12 can be trended towards a thin-type form.

Figure 3:
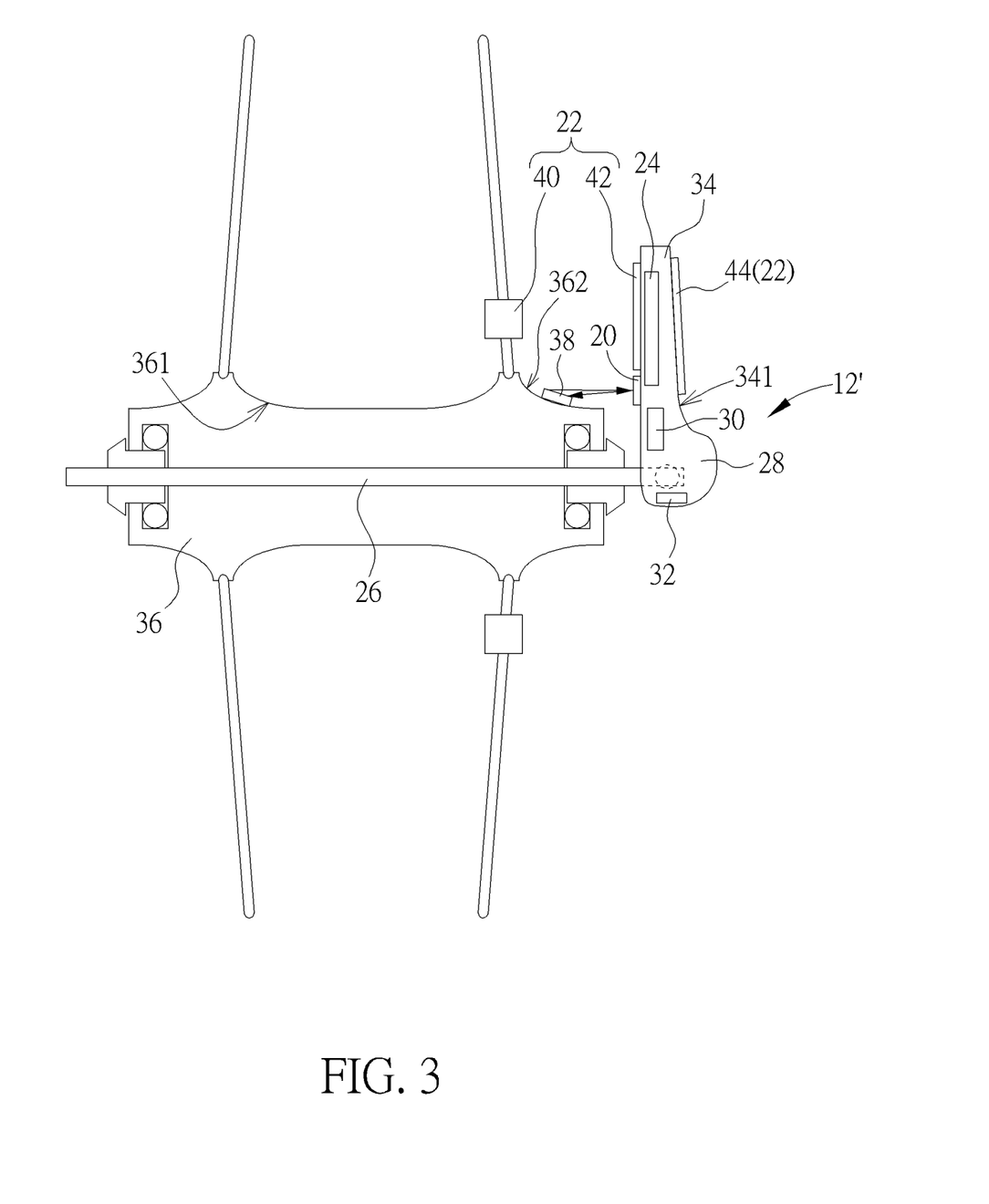
FIG. 3 is a partial diagram of the bicycle with the detachable speed determining device according to the first embodiment of the present invention.

Please refer to FIG. 3. FIG. 3 is a partial diagram of the bicycle 10 with the detachable speed determining device 12' according to the first embodiment of the present invention. In this embodiment, the bike component can be the foresaid wheel hub, the pattern 38 can be formed on an outer surface 362 of the wheel hub axle 36, and the optical detecting module 20 can be disposed on the quick releasing handle 28 and face the outer surface 362 to detect the movement of the pattern 38, so as to acquire the speed information via the occurrence frequency of the pattern 38 and the dimensions of the wheel 14. An advantage of the detachable speed determining device 12' is that the optical detecting module 20 can be easily replaced for upgraded promotion, and an advantage of the detachable speed determining device 12 can prevent the detection accuracy from being interfered by ambient light.

Figure 4:
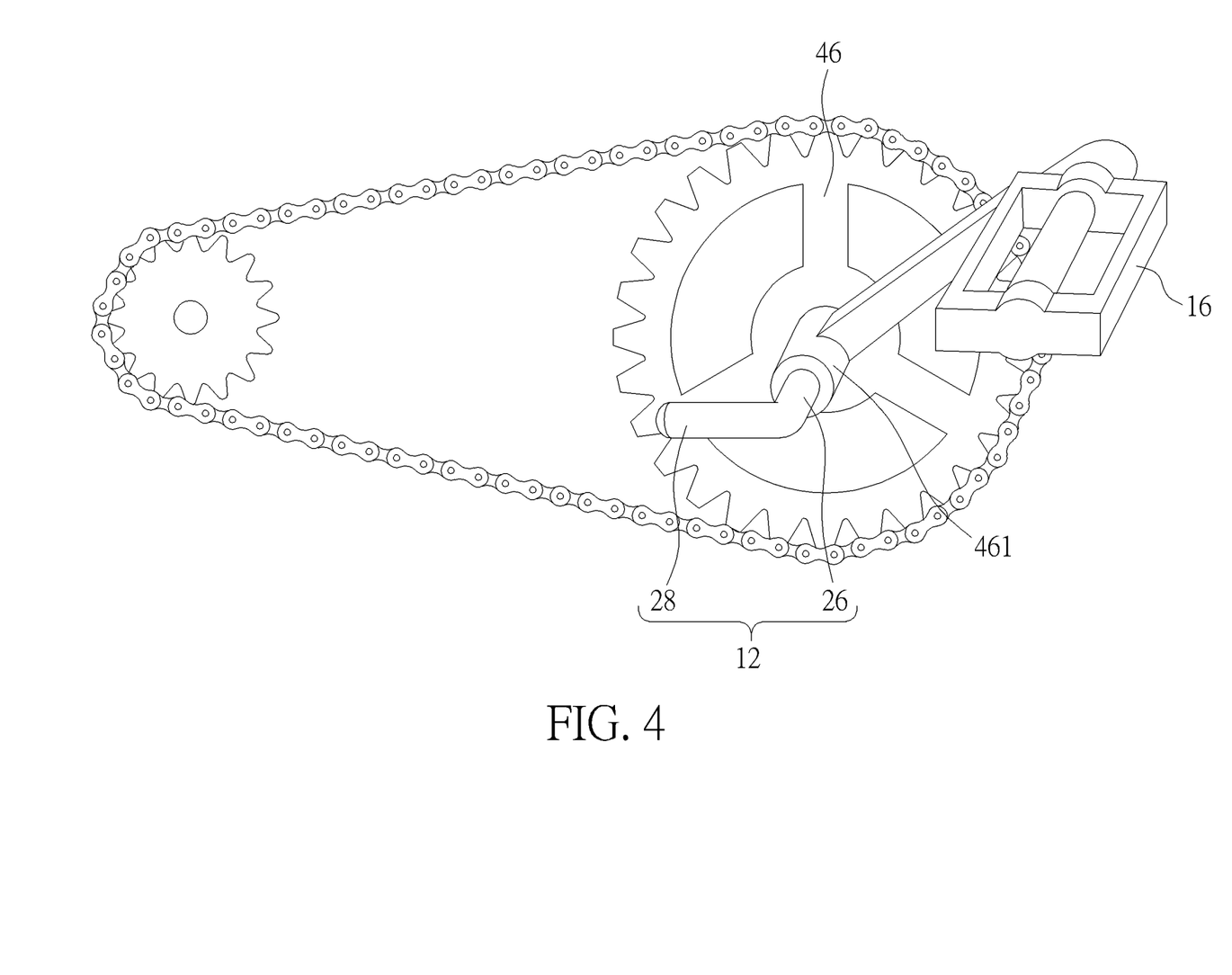
FIG. 4 is a partial diagram of a pedal and the detachable speed determining device according to a second embodiment of the present invention.
Figure 5:
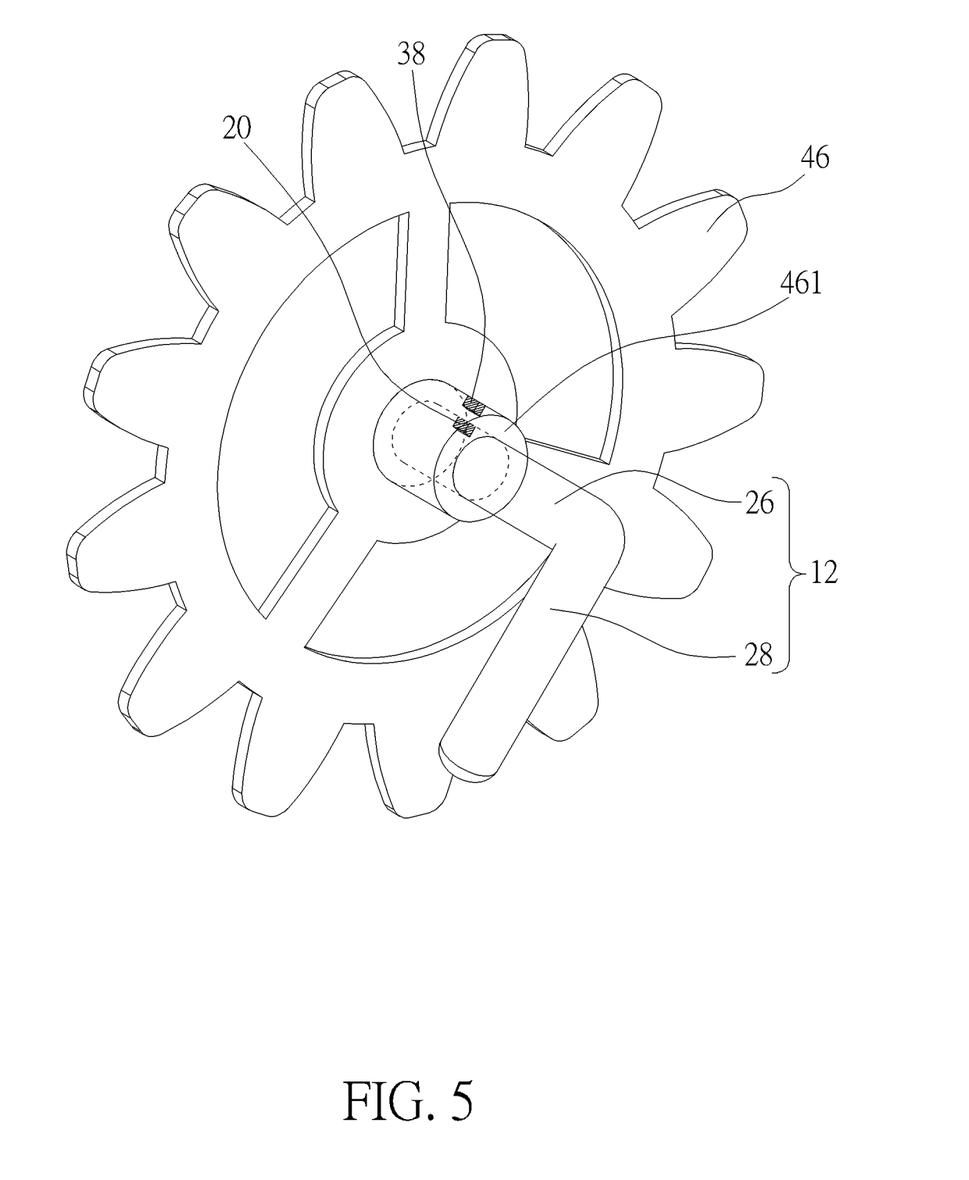
FIG. 5 is another view of the pedal and the detachable speed determining device according to the second embodiment of the present invention.
Figure 6:
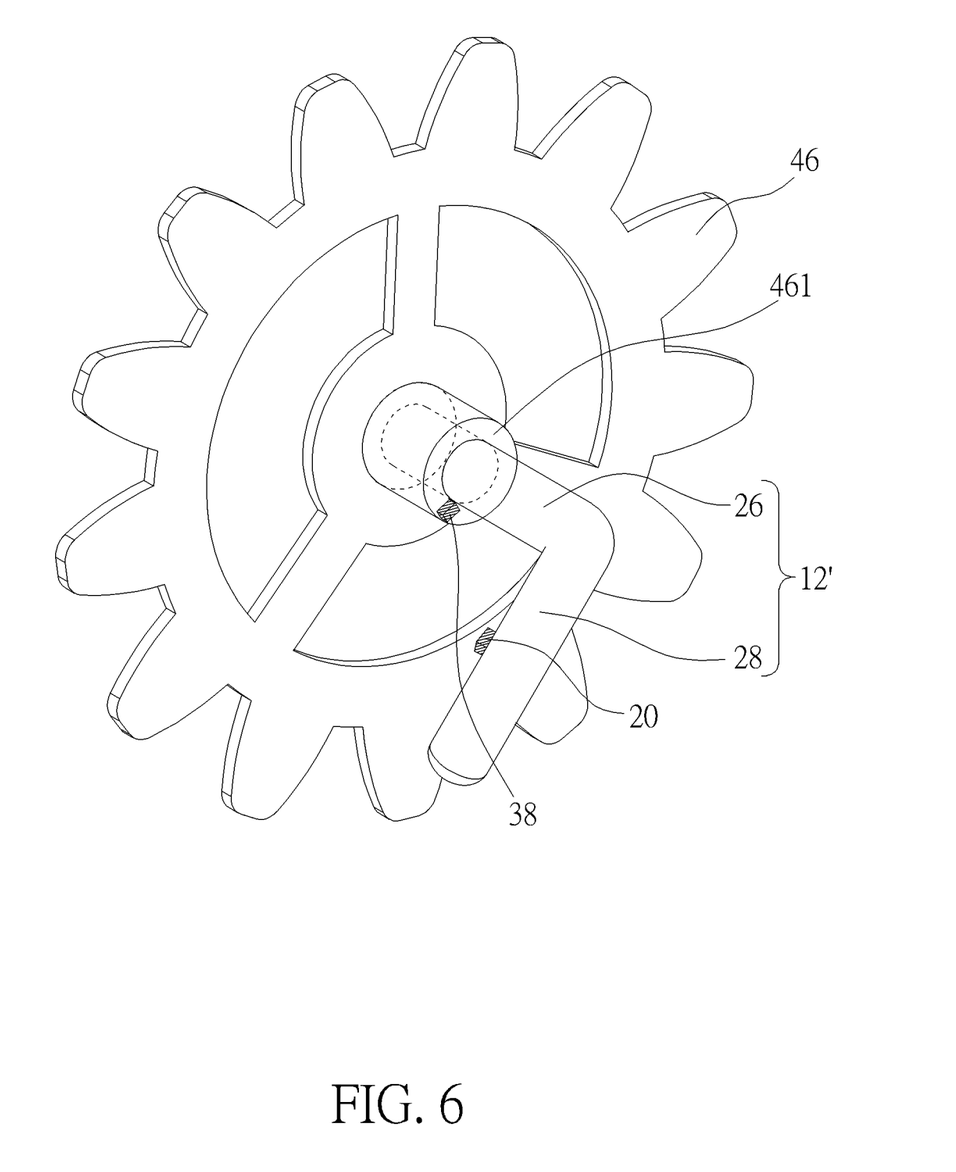
FIG. 6 is another view of the pedal and the detachable speed determining device according to the second embodiment of the present invention.

Please refer to FIG. 4 to FIG. 6. FIG. 4 is a partial diagram of the pedal 16 and the detachable speed determining device 12 according to a second embodiment of the present invention. FIG. 5 is another view of the pedal 16 and the detachable speed determining device 12 according to the second embodiment of the present invention. FIG. 6 is another view of the pedal 16 and the detachable speed determining device 12' according to the second embodiment of the present invention. The bike component can be a chain wheel 46 assembled with the pedal 16, the bolted joint 26 inserts into a chain wheel axle 461, and the quick releasing handle 28 is folded and unfolded relative to the bolted joint 26 for locking the pedal 16 onto the chain wheel 46.

As shown in FIG. 4 and FIG. 5, the pattern 38 can be formed on an inner wall of the chain wheel axle 461, and the optical detecting module 20 is disposed on the bolted joint 26 to detect the movement of the pattern 38. As shown in FIG. 4 and FIG. 6, the pattern 38 can be formed on an outer surface of the chain wheel axle 461 or the chain wheel 46, and the optical detecting module 20 is disposed on the quick releasing handle 28 to face the outer surface and detect the movement of the pattern 38. Rotation of the chain wheel 46 is directly proportional to rotation of the wheel 14, so that the movement of the pattern 38 can be transformed into the accurate speed information, such like velocity and acceleration of the bicycle.

In the present invention, number of turns of the wheel and the chain wheel are synchronized with the speed information of the bicycle, the axial rotational displacement of the bike component can be interpreted as the rotary turns of the wheel and the chain wheel, and the detachable speed determining device computes the velocity and acceleration via a detection result of the axial rotational displacement. Comparing to the prior art, the pattern and the optical detecting module can be set inside the axle or the outer surface of the bike component for easy assembly or preferred detection accuracy, the detachable speed determining device can acquire the accurate speed information even through the bicycle is in gear shifting, and manipulation of the detachable speed determining device is not affected by the weather factor and environmental interference.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detachable speed determining device, comprising:
   an optical detecting module adapted to determine axial rotational displacement of a bike component by detecting a movement of a pattern on the bike component;
   an energy generating module adapted to generate energy;
   an energy storage module sealed inside a housing of the detachable speed determining device in a water-resistance manner and electrically connected with the optical detecting module and the energy generating module, the optical detecting module being powered by the energy storage module, and the energy storage module being charged by the energy generating module;
   a bolted joint connected with the optical detecting module and the bolted joint detachably passing through a rotation axle of the bike component; and a quick releasing handle foldably disposed on the bolted joint and including the energy generating module and the energy storage module.

2. The detachable speed determining device of claim 1, wherein the bike component is a wheel hub, the pattern is formed on an inner wall of a wheel hub axle, the optical detecting module is disposed on the bolted joint, and the bolted joint inserts into the wheel hub axle to detect the movement of the pattern by the optical detecting module.

3. The detachable speed determining device of claim 1, wherein the bike component is a wheel hub, the pattern is formed on an outer surface of the wheel hub, the optical detecting module is disposed on the quick releasing handle and faces the outer surface to detect the movement of the pattern.

4. The detachable speed determining device of claim 1, wherein the bike component is a chain wheel assembled with a pedal, the pattern is formed on an inner wall of a chain wheel axle, the optical detecting module is disposed on the bolted joint, and the bolted joint inserts into the chain wheel axle to detect the movement of the pattern by the optical detecting module.

5. The detachable speed determining device of claim 1, wherein the bike component is a chain wheel assembled with a pedal, the pattern is formed on an outer surface of the chain wheel, the optical detecting module is disposed on the quick releasing handle and faces the outer surface to detect the movement of the pattern.

6. The detachable speed determining device of claim 1, wherein the energy generating module is a magnetic induction energy charging module having a permanent magnet and an induction coil, the permanent magnet is disposed on a rim of the bike component, the induction coil is spaced from the rim and located above a moving path of the permanent magnet while the bike component is rotated.

7. The detachable speed determining device of claim 1, wherein the energy generating module is a solar-based energy charging module having at least one solar panel disposed on an outer surface of the housing.

8. The detachable speed determining device of claim 1, further comprising:
   a wireless transmission module electrically connected with the optical detecting module and adapted to transmit the axial rotational displacement to an external electronic device.

9. The detachable speed determining device of claim 1, further comprising:
   a charging socket electrically connected with the energy storage module and disposed on the housing and capable of being inserted by an external charging cable.

10. A detachable speed determining device, comprising:
    an optical detecting module adapted to determine axial rotational displacement of a bike component by detecting a movement of a pattern on the bike component;
    an energy generating module adapted to generate energy; and
    an energy storage module sealed inside a housing of the detachable speed determining device in a water-resistance manner and electrically connected with the optical detecting module and the energy generating module, the optical detecting module being powered by the energy storage module, and the energy storage module being charged by the energy generating module;
    wherein the bike component is a wheel hub and the pattern is formed on an outer surface of the wheel hub or an inner wall of a wheel hub axle, or the bike component is a chain wheel assembled with a pedal and the pattern is formed on an outer surface of the chain wheel or an inner wall of a chain wheel axle.

11. The detachable speed determining device of claim 10, further comprising:
    a bolted joint passing through an axle of the bike component; and
    a quick releasing handle foldably disposed on the bolted joint.

12. The detachable speed determining device of claim 11, wherein the optical detecting module is disposed on the bolted joint, and the bolted joint inserts into the wheel hub axle to detect the movement of the pattern by the optical detecting module.

13. The detachable speed determining device of claim 11, wherein the optical detecting module is disposed on the quick releasing handle and faces the outer surface to detect the movement of the pattern.

14. The detachable speed determining device of claim 11, wherein the optical detecting module is disposed on the bolted joint, and the bolted joint inserts into the chain wheel axle to detect the movement of the pattern by the optical detecting module.

15. The detachable speed determining device of claim 11, wherein the optical detecting module is disposed on the quick releasing handle and faces the outer surface to detect the movement of the pattern.

\* \* \* \* \*